US006192789B1

United States Patent
Agcaoili et al.

(10) Patent No.: US 6,192,789 B1
(45) Date of Patent: *Feb. 27, 2001

(54) CONTACT TOASTER

(75) Inventors: Clark R. Agcaoili, St. Charles; Scott P. March, Lombard, both of IL (US)

(73) Assignee: A. J. Antunes & Co., Addison, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/283,104

(22) Filed: Mar. 31, 1999

Related U.S. Application Data

(63) Continuation-in-part of application No. 09/015,117, filed on Jan. 29, 1998, now Pat. No. 5,960,704.

(51) Int. Cl.[7] .................................................. A47J 37/08
(52) U.S. Cl. .............................. 99/349; 99/386; 99/389; 99/392; 99/443 C
(58) Field of Search ........................... 99/349, 351, 385, 99/386, 389, 392, 401, 443 C

(56) References Cited

U.S. PATENT DOCUMENTS

| | | | | |
|---|---|---|---|---|
| 2,588,851 | * | 3/1952 | Kompass | 99/386 |
| 3,589,274 | * | 6/1971 | Murray | 99/349 |
| 3,693,452 | * | 9/1972 | McGinley et al. | 99/386 |
| 3,712,207 | * | 1/1973 | McGinley et al. | 99/349 |
| 3,739,712 | * | 6/1973 | Duning | 99/349 |
| 3,835,760 | * | 9/1974 | Rekeius | 99/331 |
| 4,176,589 | * | 12/1979 | Stuck | 99/386 |
| 4,421,015 | * | 12/1983 | Masters et al. | 99/332 |
| 4,488,480 | * | 12/1984 | Miller et al. | 99/386 |
| 4,530,276 | * | 7/1985 | Miller | 99/386 |
| 5,458,051 | * | 10/1995 | Alden et al. | 99/349 |
| 5,642,657 | * | 7/1997 | Yeung et al. | 99/334 |
| 5,673,610 | * | 10/1997 | Stuck | 99/386 |
| 5,960,704 | * | 10/1999 | March et al. | 99/349 |
| 5,983,785 | * | 11/1999 | Schreiner et al. | 99/386 |
| 6,019,030 | * | 2/2000 | Kettman | 99/386 |

\* cited by examiner

*Primary Examiner*—Keith Hendricks
*Assistant Examiner*—Drew Becker
(74) *Attorney, Agent, or Firm*—Piper Marbury Rudnick & Wolfe

(57) ABSTRACT

An improved contact toaster for heating bagels, muffins and other food items features a housing containing a toasting chamber with an inlet and an outlet. The toasting chamber contains a pair of conveyor belts with a removable platen positioned between them. Two auxiliary heaters are positioned so that they heat both the platen and the conveyor belts. A pair of tensioners engage the conveyor belts so that pathways between the conveyor belts and platen taper inward to a minimum thickness and then expand outward again. As a result, food items moving through the pathways via the conveyor belts are toasted on both surfaces and also absorb heat from both the platen and the conveyor belt surfaces as they are compressed and released. The platen may be diamond shaped to increase the rate and degree of compression and release and removable so that thicker food items may be accommodated. The platen may contain upper and lower heating elements that may be individually controlled to provide greater heat in the region of maximum compression of the food item.

22 Claims, 7 Drawing Sheets

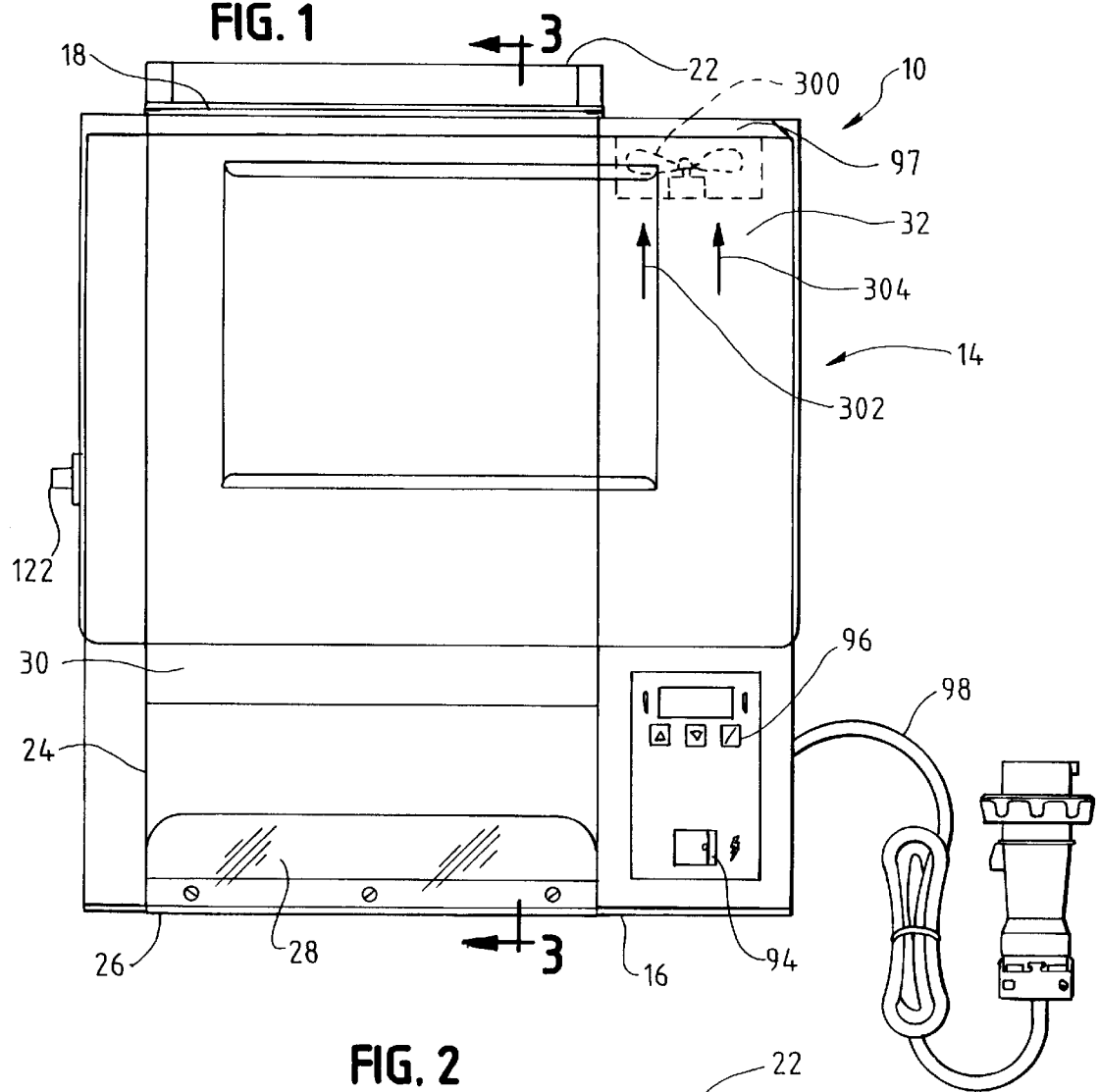
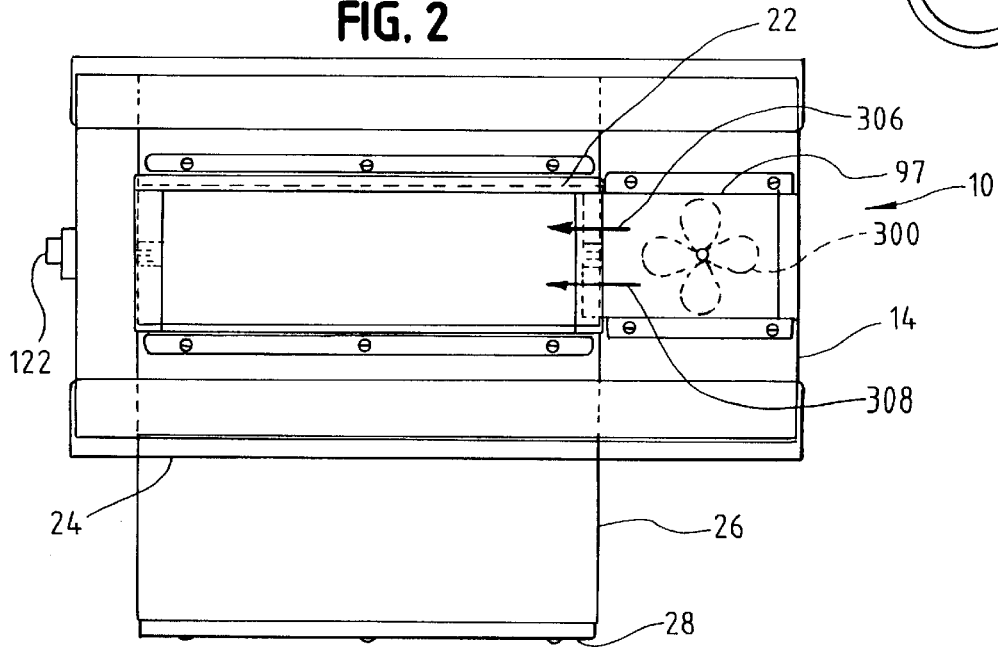

CONTACT TOASTER

CROSS REFERENCE TO RELATED APPLICATIONS

This application is a continuation-in-part of U.S. application Ser. No. 09/015,117 filed Jan. 29, 1998 now U.S. Pat. No. 5,960,704.

BACKGROUND OF THE INVENTION

1. Field of the Invention

The invention relates generally to devices for toasting food items such as sandwich buns, bagels, muffins and the like and, more particularly, to an improved contact toaster that efficiently toasts the food items' surfaces and warms them internally.

2. Description of Related Art

Toasted sandwich buns and bread slices, when used in making hamburgers and other sandwiches, are highly valued by consumers for many reasons. For example, toasting a bun results in a carmelizing effect on its interior surfaces that provides a pleasing appearance and taste. This carmelizing effect also effectively seals the interior surfaces thereby preventing the absorption of juices from the meat and other ingredients, such as ketchup and mustard, into the bun. Accordingly, with the advent of fast-food restaurants that serve sandwiches, devices that efficiently toast a large number of buns in a short period of time have become desirable.

In response to this demand, devices such as those disclosed in U.S. Pat. Nos. 4,261,257 to Henderson et al. and 4,530,276 to Miller have been developed. These toasting devices both feature a housing containing a platen having two opposed heating surfaces. Conveyor belts are positioned on opposite sides of the platen and are spaced therefrom. The two halves of a bun are inserted into inlets at the top of the housing so that they are received into the spaces between the platen and the conveyor belts. The conveyor belts in turn slide the internal surfaces of the bun halves across the platen so that they are toasted. When the bun halves reach the bottom of the conveyor belts, they are disposed upon a tray at the outlet of the housing.

While devices such as those disclosed in Henderson et al. and Miller have proven to be effective in the restaurant industry, they primarily provide only toasting of the interior surfaces of the bun halves. This is a disadvantage in that, for many reasons, it is desirable to toast the exterior surfaces (i.e.: the top and bottom) of a bun as well as heat the bun body internally. Heating the bun exterior surfaces and body provides a softer and warmer overall quality to buns that consumers find pleasing. Heating the entire bun, as opposed to just the interior surfaces, also keeps the sandwich contents warmer longer.

In addition, if the food item toasted is something other than typical bun halves, toasting only one side may not be sufficient. For example, many restaurants serve double or triple-decker sandwiches that feature a bun middle section with two interior surfaces or faces. It would be clearly preferable to toast both of these faces. The same can be said for situations where, instead of typical bun halves, the food items being toasted are bread slices. Accordingly, a device that heats both sides and the body of food items would have greater effectiveness and versatility.

As a result, devices such as the one disclosed in U.S. Pat. No. 5,673,610 to Stuck have been developed. The device of Stuck includes the same features as the two patents discussed above but adds a pair of resistance-type auxiliary heaters that are positioned in proximity to the conveyor belts. While this addition allows both sides of a bun half or similar food item to be heated, the device still suffers from a number of limitations.

The auxiliary heaters of Stuck toast the exterior surfaces of a pair of bun halves by radiating heat through the wire conveyor belts. This occurs as the bun halves are slid along the centrally positioned platen. Accordingly, the interior surface of each bun half is heated by contact with the platen while the exterior surface of each bun half is heated by radiated heat from the auxiliary heaters. Any heating of the bodies of the bun halves, however, occurs only by conduction of the heat from the surfaces. As a result, the heating of the bodies of the bun halves is much less than optimal.

In addition, the arrangement of Stuck limits the temperature level of the auxiliary heaters. More specifically, if the temperature of the auxiliary heaters is set too high, the wire conveyor belts will heat up and burn the exterior surfaces of the bun halves. This results in burnt belt marks on the exterior surfaces of the buns which consumers find undesirable. In addition, in extreme cases, the wire conveyor belts could burn down deep so that the bun halves are unusable.

Limiting the temperature of the auxiliary heaters limits the speed at which the device may be operated. This is a critical consideration in the fast-food industry. If the temperature of the auxiliary heaters could be increased without burning belt marks into the buns, the device could toast many more buns in a shorter period of time.

As many restaurants, including fast-food chains, have expanded their menu selections, a need has arisen for toasting devices that offer increased flexibility. More specifically, it is desirable that toasting devices accommodate thicker food items, such as muffins and bagels, in addition to the halves of sandwich buns.

The toasting devices of Henderson et al., Miller and Stuck suffer from limited flexibility in that they are able to accommodate only a narrow range of food item sizes. In each device, the spacing between the conveyor belts and the centrally positioned platen may be increased only slightly due to the size of the toasting device housing.

SUMMARY OF THE INVENTION

Accordingly, it is an object of the present invention to provide an improved contact toaster that toasts the interior and exterior surfaces of a food item.

It is another object of the present invention to provide an improved contact toaster that effectively heats a food item internally.

It is still another object of the present invention to provide an improved contact toaster that may efficiently toast a large number of food items in a short amount of time.

It is still another object of the present invention to provide an improved contact toaster that may accommodate a wide variety of food item sizes.

The present invention is directed to an improved contact toaster for conveyorized toasting of bagels, muffins and similar food items. The device features a housing having an inlet for receiving the food items and an outlet for discharging the food items after they are toasted. A toasting chamber is located between the inlet and the outlet and contains a pair of conveyor belts with a removable heated platen positioned between them. A drive system including an electric motor activates the conveyor belts so that they may transport bagel halves or other food items through the pathways between the conveyor belts and the platen. The pathways are sized so that a surface of each food item is slid across the platen as it moves through the pathway. This provides a toasting effect for that surface.

A pair of tensioners are positioned so that they engage the conveyor belts. The tensioners are shaped so that the pathways between the conveyor belts and platen taper inward to a minimum thickness and then expand outward again. As a result, food items are compressed and released as they travel through the pathways. Accordingly, food items are heated internally as they absorb heat from the platen in a sponge-like manner. The platen may feature a diamond-shaped cross section to increase the degree and rate of compression and release.

The toasting chamber also contains a pair of auxiliary heaters. One of each of the heaters is positioned proximate to one of each of the conveyor belts. As a result, food items are also toasted and heated internally with heat from the auxiliary heaters and conveyor belts as they are compressed and released in the pathways.

A pair of abutment members are mounted upon a pair of axial rods rotatably mounted in the housing of the device. One of each of the abutment members engages one of each of the pair of tensioners. As a result, the thickness of the pathways may be adjusted to accommodate food items of various sizes.

The platen may be removed so that thicker items, such as muffins, may be propelled by both conveyor belts so as to be toasted and heated internally.

A chute is positioned between the conveyor belts and the outlet. One of the conveyor belts is positioned in closer proximity to the chute than the other conveyor belt and is operated at a higher speed. As a result, for example when bagel halves are prepared, a first toasted bagel half is dropped on the chute by the proximate conveyor belt and then the other bagel half is dropped on top of it as the first bagel half slides down the chute to the outlet. This allows the bagels or other food items to be received at the outlet in a stacked configuration.

The device also features a damper positioned at the inlet and outlet to reduce heat loss and improve efficiency.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 1 is a front elevational view of an embodiment of the improved contact toaster of the present invention;

FIG. 2 is a top plan view of the improved contact toaster of FIG. 1;

DESCRIPTION OF THE PREFERRED EMBODIMENTS

Figure 3:
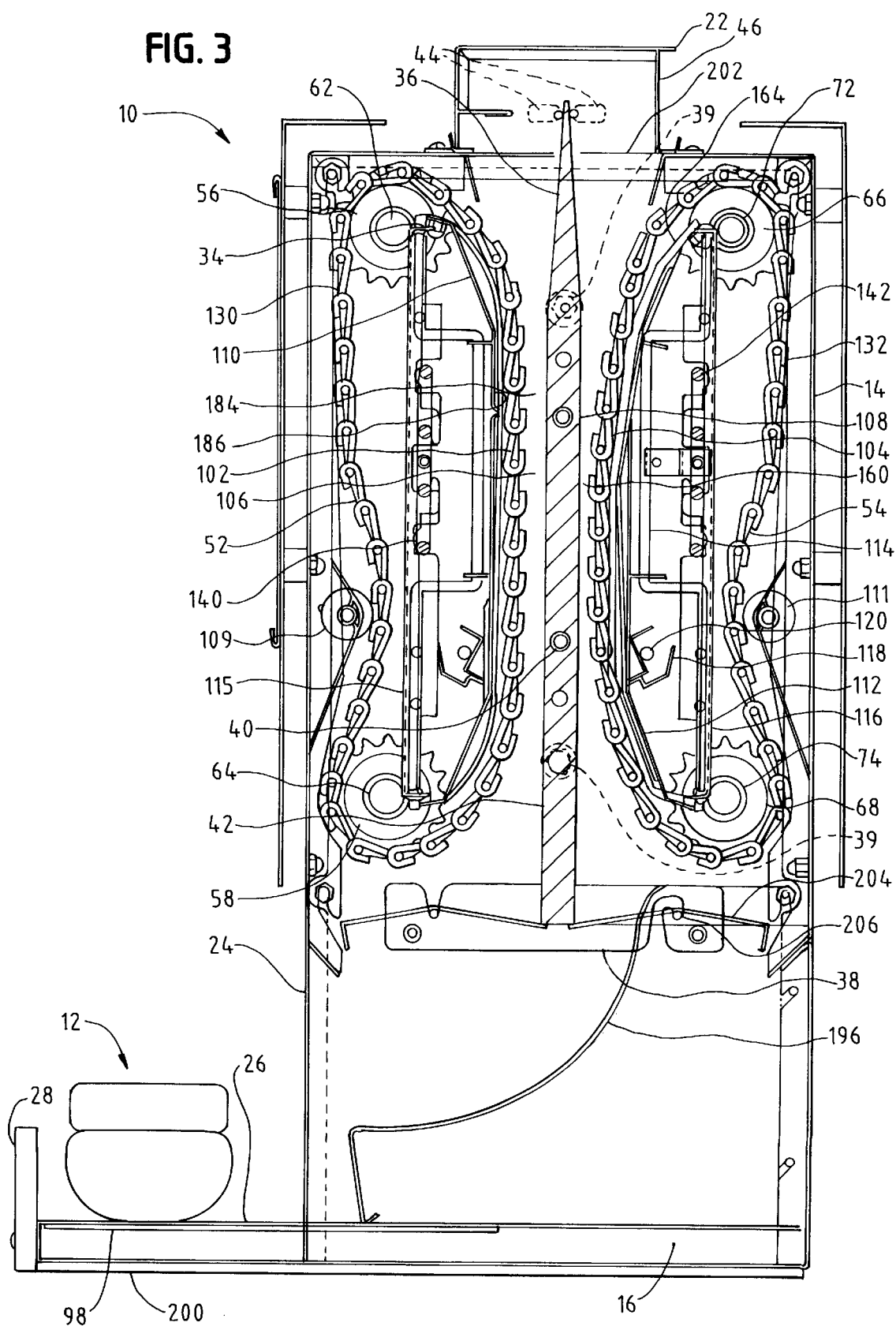
FIG. 3 is a vertical cross-sectional view of the improved contact toaster taken along line 3–3 of FIG. 1.

With reference to FIGS. 1 through 3, an improved contact toaster constructed in accordance with the present invention is indicated generally at 10. While contact toaster 10 may be employed to toast a variety of food items, the embodiment illustrated is particularly adapted to toasting the two halves of a sandwich bun, such as the one indicated generally at 12 in FIG. 3.

As shown in FIGS. 1 and 2, the contact toaster 10 features a housing 14 positioned upon a base 16. An inlet 18 is positioned through the top of housing 10 and receives the bun halves to be toasted. For purposes discussed below, inlet 18 is covered by a bun feeder 20. An outlet 24 is positioned near the bottom of housing 14 and features a tray 26, with a bun stop 28, for receiving toasted buns from the device (as illustrated with bun 12 in FIG. 3). Housing 14 is divided basically into two sections. The first section, indicated at 30 in FIG. 1, houses a toasting chamber. The second section, indicated at 32, houses a drive and control area. Both of these sections will be discussed in more detail below.

Turning to FIG. 3, a toasting chamber 34 is defined within section 30 of housing 14. A platen 36 is disposed through the middle of toasting chamber 34 and is held in place by horizontal bracket 38 which in turn is secured to housing 14. In addition, pins 39 in the side of platen 36 engage vertical grooves (not shown) on the inner surface of section 30 of housing 14. Platen 36 contains resistance heating elements 40a–40d so that its opposing surfaces are heated. The top portion of platen 36 is tapered inwardly so as to ease the feeding of bun halves into the toaster through inlet 18 (FIG. 1). To facilitate movement of the halves across platen 36, its surfaces should have smooth, non-stick surfaces. Preferably, such surfaces are provided by wrapping a removable platen sheet 42, made of TEFLON® or a similar non-stick material, around the length of platen 36. The platen sheet 42 is attached to platen 36 with clips 44.

Bun handler 22 lifts off of housing 14 so that platen 36 may be slid up out of bracket 38 and housing 14 (though inlet 18 of FIG. 1) for replacement of platen sheet 42 and other cleaning and maintenance tasks. When contact toaster 10 is in operation, bun handler 22 is preferably in place to prevent items from inadvertently entering toasting chamber 34. Buns are fed into bun handler 22, and thus through inlet 18 (FIG. 1), through side opening 46.

A pair of link conveyor belts, indicated at 52 and 54, are positioned on opposite sides of platen 36. Conveyor belt 52 is looped around a pair of sprocket wheels 56 and 58 that are secured to axles 62 and 64 in a fixed relationship. Axles 62 and 64 are mounted to housing 14 so that they rotate. Conveyor belt 54 is mounted in a similar fashion about sprocket wheels 66 and 68 and axles 72 and 74.

Figure 4:
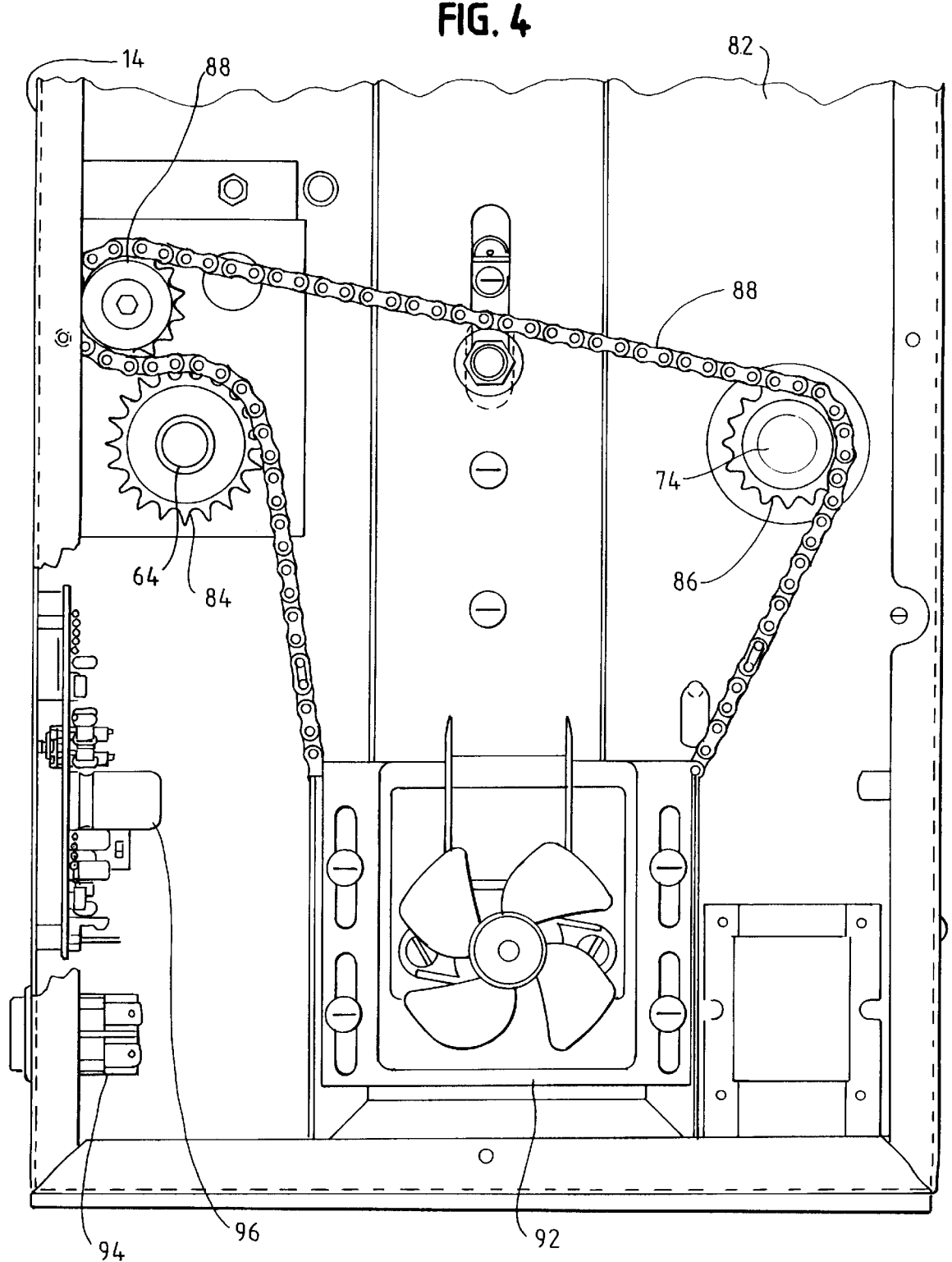
FIG. 4 is a side elevational view of the drive mechanism for the conveyor belts of the improved contact toaster of FIG. 1.

Referring to FIG. 4, axles 64 and 74 extend into the drive and control area 82 housed within section 32 (FIG. 1) of housing 14. The portions of axles 64 and 74 within control area 82 have secured thereto sprocket wheels 84 and 86, respectively. A drive chain 88 wraps around sprocket wheels 84 and 86 as well as an idler gear 88 and a driven gear (not shown) that is rotated by electric motor 92. As a result, electric motor 92 activates conveyor belts 52 and 54 of FIG. 3. Drive and control area 82 also contains a power switch 94 for the device as well as temperature controls 96 that regulate the temperatures of platen 36 and a pair of auxiliary heaters (to be discussed below). Referring to FIG. 1, these electrical components are cooled by air from an air duct 97, positioned on the top of housing section 32, and receive power via an electrical cord, indicated at 98.

Returning to FIG. 3, conveyor belts 52 and 54 feature platen-facing portions 102 and 104 which, along with platen 36, define pathways 106 and 108. Bun halves fed into inlet 118, with their interior surfaces directed towards platen 36, are moved by platen-facing portions 102 and 104 of conveyor belts 52 and 54 through pathways 106 and 108. Pathways 106 and 108 are sized so that the interior surfaces of the bun halves are pressed and slid against platen 36. As a result, the interior surfaces of the bun halves are toasted. A typical bun, however, includes a crown portion and a heel portion that are of unequal dimensions. For example, the crown portion is usually of a greater thickness than the heel portion. Accordingly, it is desirable that the thickness of paths 106 and 108 be adjustable. The present invention allows for this as follows.

Platen facing portions 102 and 104 are biased towards platen 36 by tensioners 110 and 112, respectively, while slack in conveyor belts 52 and 54 is taken up by spring mounted idler rollers 109 and 111. To continue, with tensioner 112 as an example, tensioner 112 is rotatably mounted to a pivot rod, indicated at 114. In turn, pivot rod 114 is rotatably mounted to vertical bracket 116, the latter of which is connected to housing 14. An abutment member 118 is mounted upon an axial rod 120 so as to engage tensioner 112. Abutment member 118 features a profile having a number of sides with surfaces of varying radial distance from axial rod 120. Axial rod 120 is rotatably mounted to housing 14 with one end extending therethrough.

A knob, indicated at 122 in FIGS. 1 and 2, is connected to the extending end of axial rod 120. Accordingly, when knob 122 is turned, axial rod 120 rotates so that a different side of abutment member 118 contacts tensioner 112. As a result, the position of tensioner 112, with respect to platen 36, is changed. An operator may thus adjust the size of pathway 108 so that food items of various thicknesses may be accommodated by the device. The size of pathway 106 may be adjusted in a similar manner.

The links of conveyor belts 52 and 54 are covered by heat-distributing surfaces 130 and 132, preferably in the form of silicon sheets. Alternatively, the heat-distributing surfaces 130 and 132 may be constructed of TEFLON®, stainless steel screen or any other flexible material that allows heat to be distributed it over its surface. Heat distributing-surfaces 130 and 132 are also preferably wrapped about conveyor belts 52 and 54 and held in place by clips so that they may be removed for cleaning.

A pair of auxiliary heaters, indicated at 140 and 142 in FIG. 3, are mounted to vertical brackets 115 and 116, respectively. Auxiliary heaters 140 and 142 are sheet-type heating elements of a quartz or resistance type and are controlled by temperature controls 96 (FIG. 1). Due to their positioning, they heat the heat-distributing surfaces of platen-facing portions 102 and 104. As a result, the outer surfaces of the bun halves traveling through pathways 106 and 108 are toasted by contact with platen-facing portions 102 and 104 of conveyor belts 52 and 54.

Figure 5:
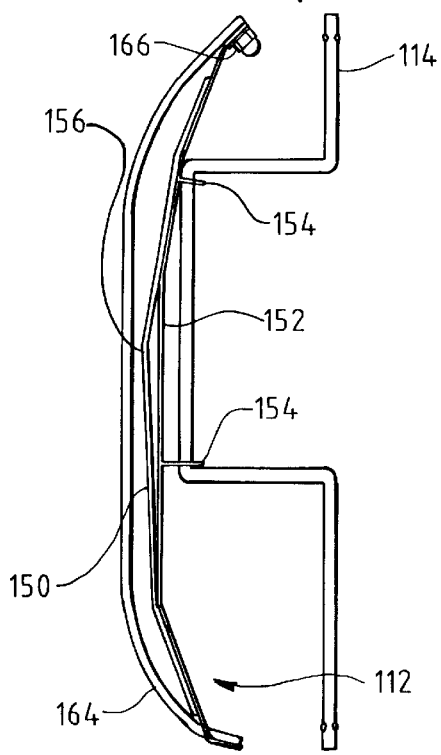
FIG. 5 is an enlarged side elevational view of the crown tensioner and slide shield of the improved contact toaster of FIG. 1.

Referring to FIG. 5, an enlarged view of tensioner 112 is shown. As may be seen in FIG. 5, tensioner 112 is actually composed of two pieces, indicated at 150 and 152. Both of these pieces are preferably constructed of a somewhat flexible but strong material such as sheet metal. Pieces 150 and 152 may be joined by any permanent method, such as welding or adhesive. Piece 152 has a pair of tabs 154 formed therein that engage pivot rod 114 in a hinge-like fashion.

Piece 150 is joined to piece 152 so as to give tensioner 112 an overall arc-like shape or profile with an apex indicated at 156. As a result of the arc-like shape of tensioner 112, as may be seen in FIG. 3, platen-facing portion 104 tapers inward toward platen 36 and then back out again. This provides pathway 108 with a thickness that tapers inward to a point of minimum thickness, indicated at 160 and corresponding to the apex 156 of tensioner 112 (FIG. 5), and then expands outward again. As a result, a food item traveling through path 108 is gradually compressed to a minimum thickness and is then gradually released to expand back to near it original size. This key feature allows the food item to internally absorb heat from both platen 36 and the heat-distributing surface 132 of platen-facing portion 104 in a sponge-like manner.

Figure 6:
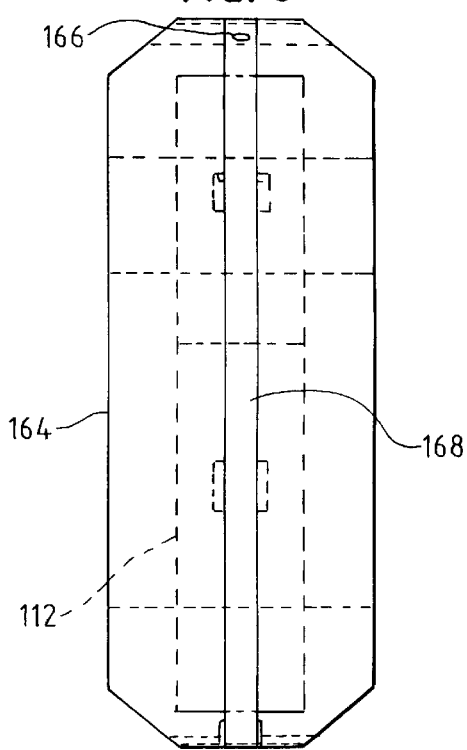
FIG. 6 is a front elevational view of the crown tensioner and slide shield of FIG. 5.

As shown in FIGS. 5 and 6, a slide shield, indicated at 164, is attached to tensioner 112 via nut and bolt 166. As shown in FIG. 3, slide shield 164 separates tensioner 112 and the platen-facing portion 104 of conveyor belt 54. Slide shield 164 is made of a heat-resistant material, such as polytetrafluoroethylene, or PTFE plastic, and preferably has positioned thereon a slide rail constructed of a strip of TEFLON®, indicated at 168 in FIG. 6. This construction allows the heat-distributing surface of conveyor belt 54 to smoothly and quietly slide over tensioner 112.

Figure 7:
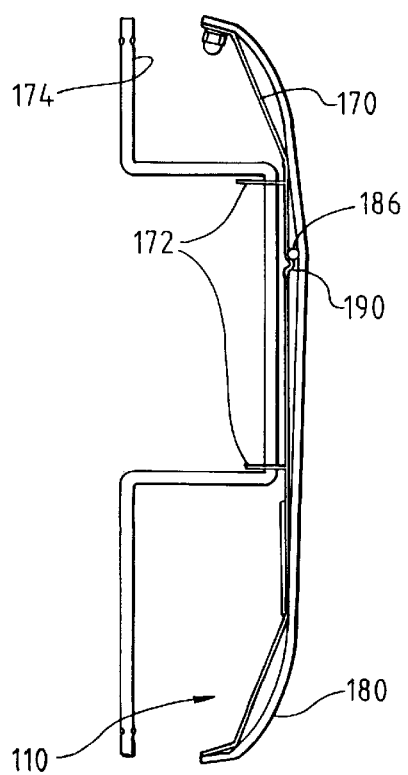
FIG. 7 is an enlarged side elevational view of the heel tensioner and slide shield of the improved contact toaster of FIG. 1.
Figure 8:
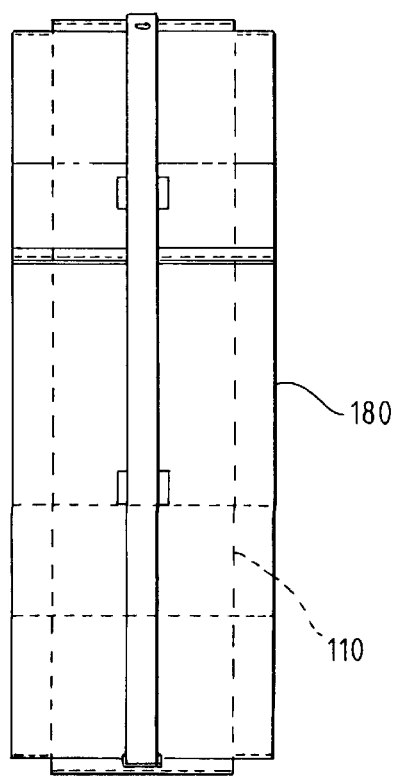
FIG. 8 is a front elevational view of the heel tensioner and slide shield of FIG. 7.

Turning to FIG. 7, an enlarged view of tensioner 110 is shown. Tensioner 110 features a main piece, indicated at 170, that features tabs 172 that engage pivot rod 174 in a hinge-like fashion (as with tabs 154 in FIG. 5). As with tensioner 112, tensioner 110 may be made of sheet metal and has attached thereto a slide shield 180. Slide shield 180 is similar in construction to, and serves the same purpose as, slide shield 164 (FIGS. 5 and 6). As with pathway 108, tensioner 110 provides pathway 106 with a thickness that tapers inward to a minimum thickness, indicated at 184 in FIG. 3, and then expands outward again. The minimum thickness 184 of pathway 106 corresponds to a rod, indicated at 186 in FIGS. 3 and 7, that is placed between slide shield 180 and tensioner 110. Rod 186 is held in position with a hump 190 formed in the main piece 170 of tensioner 110.

As a result, food items traveling through pathway 106 also compress and expand so that they are heated internally by heat from platen 36 and the heat-distributing surface 130 of platen-facing portion 102. While food items traveling through pathways 106 and 108 are thus heated internally in the same manner, the construction of tensioner 110 causes the compression and release of pathway 106 to be more abrupt. It has been found that the construction of tensioner 110, and the associated more abrupt compression and release of pressure, is more suitable for heating thinner food items such as the heel portions of sandwich buns. In contrast, it has been found that the more gradual taper provided by tensioner 112 is more effective for thicker items such as the crown portions of sandwich buns. Accordingly, it is preferable that sandwich bun halves be inserted into the device of FIG. 3 so that the crown portions pass through pathway 108 and the heel portions pass through pathway 106.

To summarize thus far, a food item, such as a bun half, is placed into the device of FIG. 3 so that it passes through either pathway 106 or pathway 108, as propelled by conveyor belts 52 or 54. As the bun half passes through, for example, pathway 106, its interior surface is maintained in sliding contact with platen 36 so that it is toasted. Simultaneously, the exterior or outer surface of the bun half is in contact with the heat-distributing surface 130 of the platen-facing portion 102 of conveyor belt 52. Because heat-distributing surface 130 receives heat from auxiliary heater 140, it toasts the exterior surface of the bun half. As the bun half travels through pathway 106, it is also compressed to a minimum thickness and then released so that it may expand to nearly its original thickness. This causes the bun half to be heated internally in a sponge-like manner by heat absorbed from platen 36 and platen-facing portion 102.

As a result of this novel heating method, the contact toaster of the present invention offers many advantages over existing contact toasters, such as the one described in U.S. Pat. No. 5,673,610 to Stuck, wherein the exterior surfaces of bun halves are radiated with heat from auxiliary heaters. For example, the buns toasted and heated by the present invention offer a higher overall or "equilibriated" temperature. More specifically, the contact toaster of the present invention effectively heats the interior surface, exterior surface and body of a bun half. In contrast, the contact toaster of Stuck primarily heats the exterior and interior surfaces of a bun half with only incidental heating of the body. As a result, while the bun may feel warm when a consumer touches the exterior and interior surfaces, when she or he bites into the bun, the body is cooler. In addition to the improved tactile sensation of a warmer overall bun, the interior and exterior surfaces of buns toasted by the present invention will stay longer warmer because there will be less heat transfer into the heated body from the surfaces.

The contact toaster of the present invention may also toast and heat buns faster because there is minimal or no contact between the metallic links of conveyor belts 52 and 54 and the food item. More specifically, auxiliary heaters 140 and 142 may be operated at a higher temperature than the auxiliary heaters of Stuck because, due to heat-distributing surfaces 130 and 132, there is minimal danger that the links of conveyor belts 52 and 54 will burn into the bun halves. This allows the temperature of auxiliary heaters 140 and 142 to be raised to a higher level which shortens the time that the buns must spend in pathways 106 and 108 to be properly toasted and heated. This advantage in speed is of great importance in the fast-food industry where time efficiency is key to success.

With reference to FIG. 3, toasted and heated bun halves emerging from pathways 106 and 108 drop onto a chute, indicated at 196. After sliding down chute 196, the buns pass through outlet 24 and onto tray 26 for use. The speed of conveyor belt 54 may be increased by decreasing the diameter of sprocket wheel 86 (FIG. 4). As a result, the speed of conveyor belt 54 may be adjusted so that the crown portion falls onto chute 196 first with the corresponding heel portion dropping on top of it as it slides down chute 196. This results in the bun halves arriving at tray 26 in a stacked configuration, as shown in FIG. 3. This is desirable from a worker and space efficiency standpoint. A base heater 198 in tray 26 keeps the stacked buns warm while they are awaiting use.

The embodiment of the invention illustrated also includes a number of features that make it more energy efficient. As shown in FIG. 3, the bottom of the device features as gasket, indicated at 200, that minimizes heat transfer out of the device through base 16. In addition, inlet and outlet dampers, indicated at 202 and 204, respectively, reduce heat loss out of inlet 18 and outlet 24. Inlet dampers 202 are formed of two flaps made of TEFLON® or a similar material. One end of each flap is clipped to housing 14 so that dampers 202 flex downward to let the food items pass by and into toasting chamber 34. Outlet dampers 204 are balanced about pins 206 so as to be biased in the closed position. As a result, when food items drop out of pathways 106 and 108, outlet dampers 204 swing open to allow passage and then swing shut once again. By reducing the escape of heated air, inlet and outlet dampers 202 and 204 reduce the energy required to maintain toasting chamber 34 and the components therein, such as platen 36, at the proper temperature.

In addition, positioned within air duct 97, on the top of housing 14, is a fan indicated in phantom in FIGS. 1 and 2 at 300. Fan 300 allows an air curtain system to be provided above inlet dampers 202 (FIG. 3). More specifically, as shown in FIG. 1 by arrows 302 and 304, air is drawn into fan 300 and is ducted out across inlet 18, as indicated by arrows 306 and 308 in FIG. 2. As a result, an air curtain is provided across inlet 18 which provides for additional containment of heat within the device.

Figure 9:
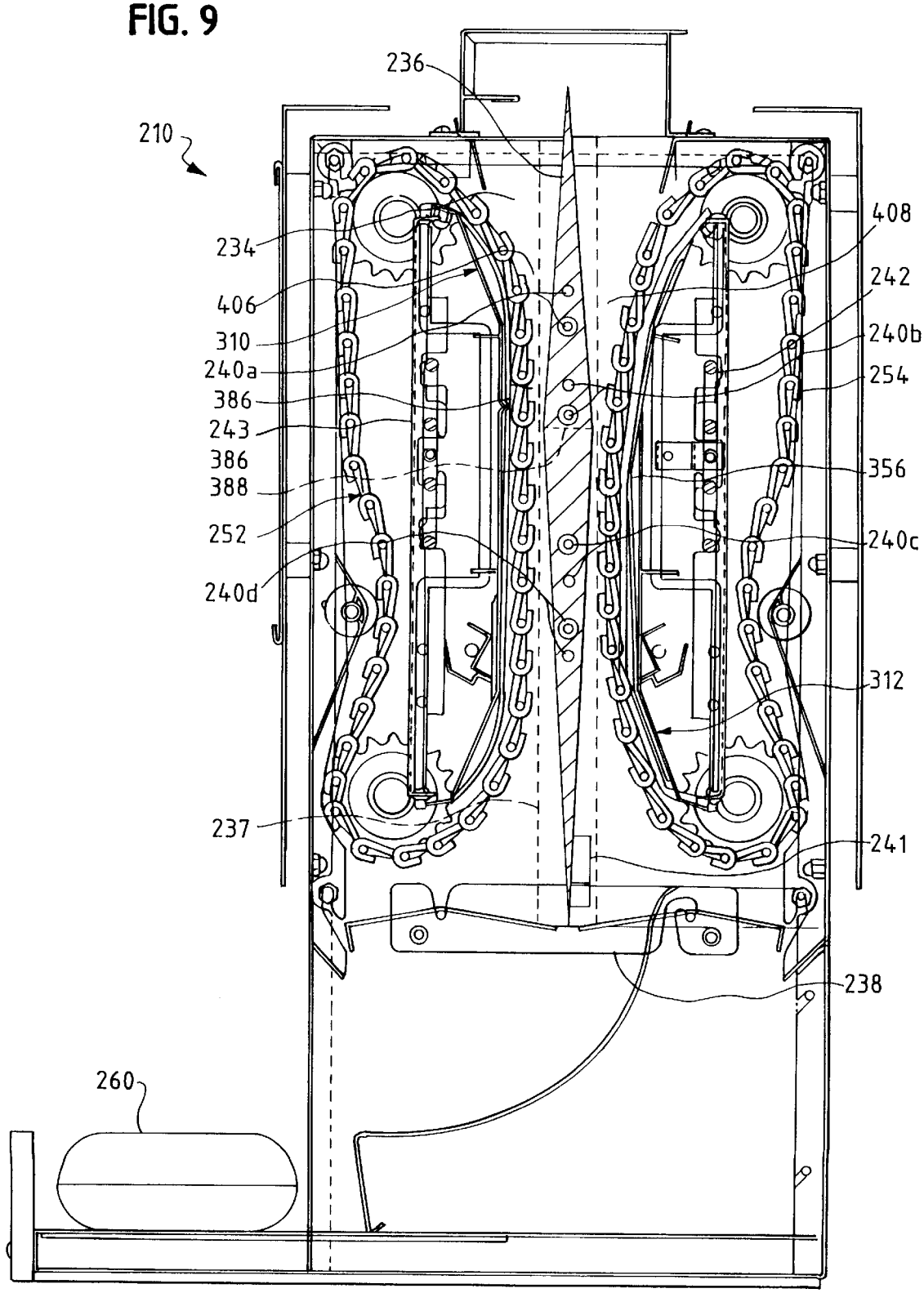
FIG. 9 is a vertical cross-sectional view of a second embodiment the improved contact toaster of the present invention.

A second embodiment of the improved contact toaster is indicated generally at 210 in FIG. 9. Except for the components discussed below, the contact toaster 210 of FIG. 9 features a construction that is identical to the contact toaster 10 of FIG. 3. As will be described, the contact toaster of FIG. 9 may efficiently toast bagels, muffins and similar food items.

As illustrated in FIG. 9, the contact toaster 210 features a toasting chamber 234. A removable platen 236 is positioned through the middle of the toasting chamber and is held in place by vertical channels 237 on the inner surface of the toaster housing. Such channels may be formed, for example, by generally U-shaped sheet metal members that are riveted or welded to the inner surface of the housing. The bottom of the platen is supported by bracket 238.

The platen 236 is made of a heat conductive material such as metal and contains resistance heating elements 240a–240d that receive power through plug 241. Such plugs are well known in the art. A person may remove platen 236 by grasping its upper edge and pulling upwards so that the plug 241 disconnects. The platen may then be lifted out of vertical channels 237 through the top of the toaster housing resulting in the configuration of FIG. 10. Conversely, the platen may simply be reinserted into the channels 237 so that the plug 241 connects.

Due to the presence of auxiliary heaters 242 and 243, the resistance heating elements 240a–240d may optionally be omitted from the platen 236 so that construction of the toaster is simplified. More specifically, the auxiliary heaters 242 and 243 warm platen 236. As a result, the surfaces of platen 236 absorb heat so that food items slid along the platen are toasted.

The TEFLON® platen sheet of FIG. 3 (indicated at 42) has been omitted from the platen 236 of FIG. 9 because it is unable to withstand the high temperatures required to efficiently heat food items such as bagels and muffins. These temperatures may range from approximately 600° F. to 900° F. or greater. The heat distributing surfaces of FIG. 3 (130 and 132) have also been omitted from the belts 252 and 254 of FIG. 9 for the same reason. While the belts 252 and 254 are constructed of metal, or a similar heat conductive material, the firm surfaces of the bagels and muffins can withstand direct contact with the belts without severe burning or damage.

Figure 11:
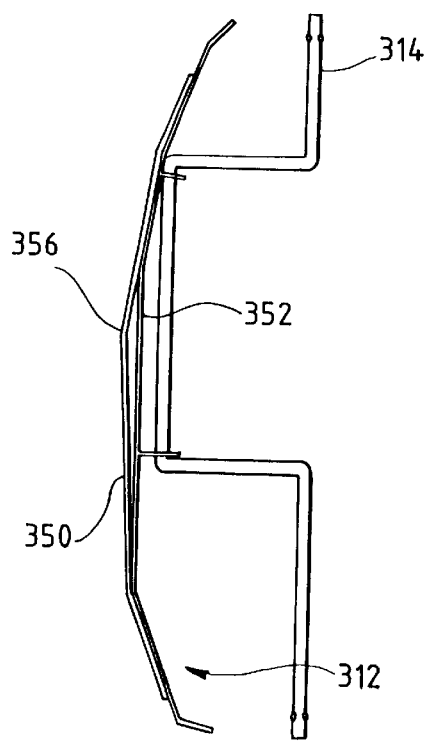
FIG. 11 is an enlarged side elevational view of the right tensioner of the improved contact toaster of FIG. 9.
Figure 12:
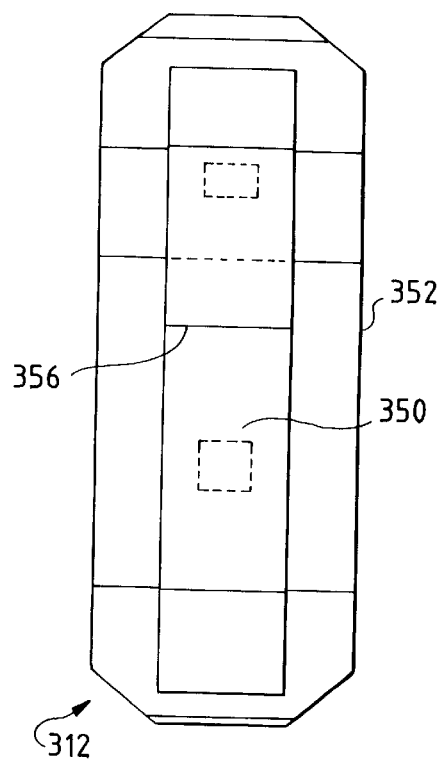
FIG. 12 is a front elevational view of the tensioner of FIG. 11.

The platen-facing portions of belts 252 and 254 are biased towards platen 236 by tensioners 310 and 312. Enlarged views of tensioner 312 are shown in FIGS. 11 and 12. Tensioner 312 is constructed of two pieces, 350 and 352. Pieces 350 and 352 may be constructed of a strong and flexible material, such as metal, and are joined by any permanent method (such as welding or adhesive). Piece 350 is bent so as to provide tensioner 312 with an overall arc-like shape or profile with an apex as indicated at 356. In contrast to the tensioner 112 of FIGS. 5 and 6, tensioner 312 does not include a slide shield (164 in FIGS. 5 and 6) due to the high temperatures within the toaster. The function of apex 356, and the arc-like shape of tensioner 312, will be explained below with respect to FIGS. 9 and 10.

A pair of tabs are formed in piece 352 so that tensioner 312 may be pivotally connected to pivot rod 314. As described previously with regard to FIG. 3 and pivot rod 114, pivot rod 314 allows the tensioner 312 to be pivotally mounted within the housing of the toaster.

Figure 13:
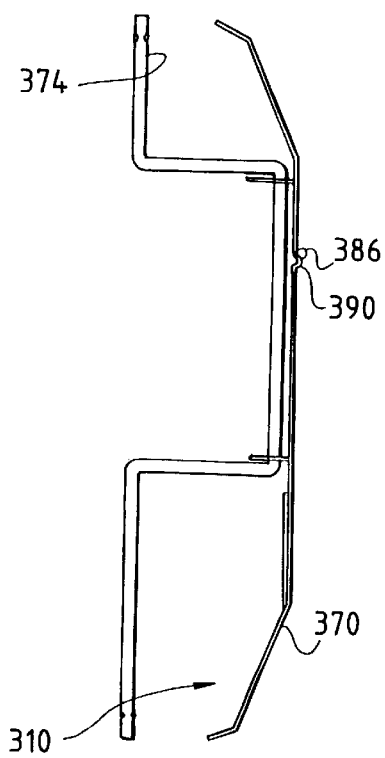
FIG. 13 is an enlarged side elevational view of the left tensioner of the improved contact toaster of FIG. 9.
Figure 14:
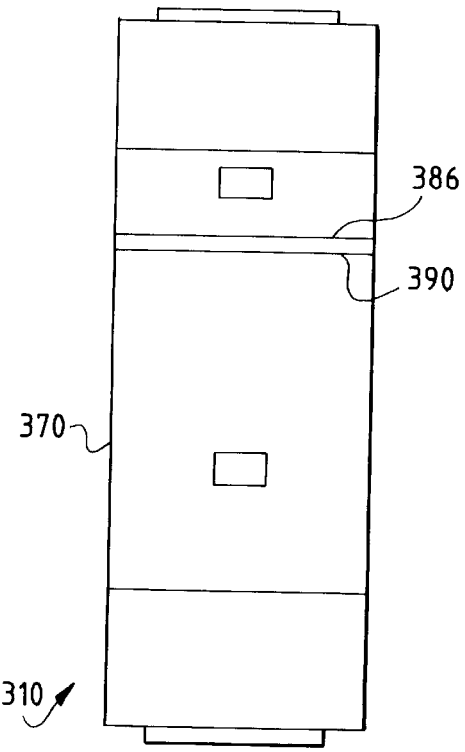
FIG. 14 is a front elevational view of the tensioner of FIG. 13.

The details of tensioner 310 are shown in FIGS. 13 and 14. Tensioner 310 features a main piece 370 that is constructed of metal or the like. Piece 370 features tabs that engage pivot rod 374. As with pivot rod 314, pivot rod 374 allows the tensioner to be pivotally mounted within the housing of the toaster. Piece 370 also features a hump 390 which supports a metal (or similar material) rod 386. Rod 386 may be held in position by welding, adhesive or similar permanent fastening methods.

The operation of the improved contact toaster, with the platen 236 seated therein, will now be explained with respect to FIG. 9. With the platen positioned as shown in FIG. 9, the toasting chamber 234 features two pathways, indicated at 406 and 408. The two halves of a food item, such as bagel 260, are inserted through the top of the toaster. As a result, the first bagel half passes through pathway 406 and along the surface of the platen by belt 252 while the second half passes through pathway 408 and along the opposite platen surface by belt 254.

As the first bagel half approaches the rod 386 of tensioner 310, it is compressed. After being compressed to its minimum thickness in the vicinity of the rod 386, the first bagel half expands back to its original thickness as it travels towards the toaster outlet. This process allows the interior of the bagel to be heated more efficiently. That is, the thermal conductivity of the food item is increased as a result of the air being squeezed out of its interior. In addition, as the food item expands back to its original thickness, heated air is absorbed by its interior in a sponge-like fashion. Due to contact with the heated platen surface and the heated belt, the exterior surfaces of the first bagel half are also toasted.

The second bagel half, propelled by belt 254, is squeezed to a minimum thickness at the apex 356 of tensioner 312. The pressure on the second bagel half is then gradually released as it travels towards the toaster outlet. As a result, the second bagel half is also heated internally while being toasted by the platen and belt 254.

The rod 386 of tensioner 310 provides a more abrupt compression and release of pressure in comparison with the apex 356 of tension 312. It has been found that, as a result, tensioner 310 is more suitable for toasting and heating the thinner halves of food items. In contrast, tensioner 312 is more suitable for toasting and heating the thicker halves of food items.

The compression and release provided by the rod 386 of tensioner 310 and apex 356 of tension 312 may optionally be supplemented by providing a platen having the shape of platen 236 in FIG. 9. More specifically, as illustrated in FIG. 9, the platen may have a diamond-shaped cross section with a maximum horizontal width or thickness, indicated by dashed line 388 in FIG. 9, in the vicinity of the rod 386 and apex 356. When such a platen is used, the bagel halves are squeezed from both sides instead of just the sides adjacent to the belts. Such an arrangement increases the degree and rate of food item compression which may be desirable and necessary for heating the interiors of denser food items (such as bagels).

Figure 10:
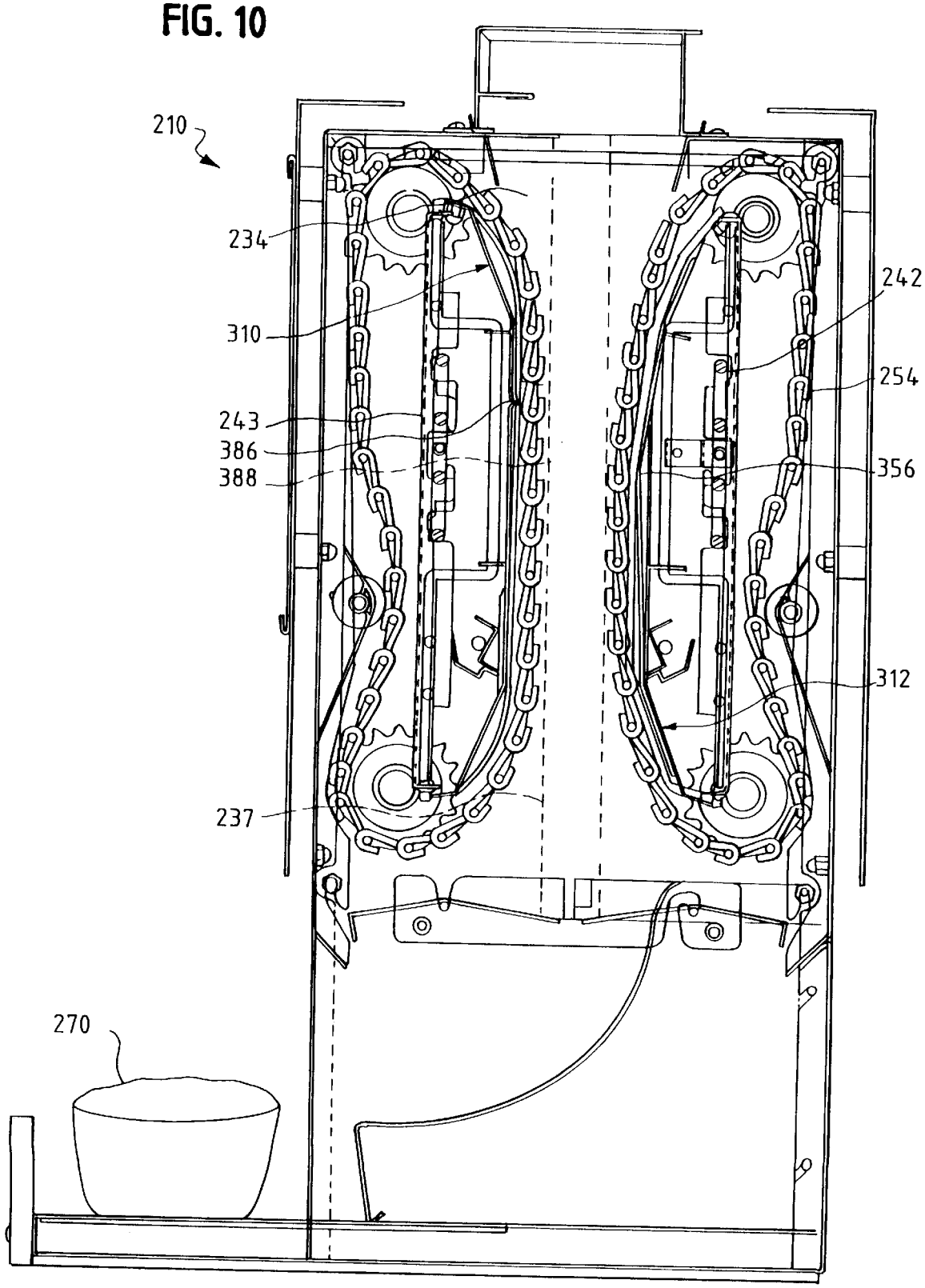
FIG. 10 is a vertical cross-sectional view of the improved contact toaster of FIG. 9 with the platen removed.

FIG. 10 illustrates the contact toaster with the platen removed. Such a configuration is desirable when toasting thicker food items such as muffins (illustrated at 270 in FIG. 10). In operation, the muffin is inserted through the top of the toaster so that is propelled through the pathway 388 within toasting chamber 234 via belts 252 and 254. In the vicinity of the rod 386 of tensioner 310 and the apex 356 of tension 312, the muffin is compressed to its minimum thickness. As the muffin travels towards the outlet of the toaster, the pressure upon it is gradually released so that it returns to its original thickness. As a result, the interior of the muffin is heated. As the muffin is traveling through the pathway 388, its exterior surfaces are also toasted by the belts 252 and 254.

Returning to FIG. 9, platen resistance heaters 240*a*–240*d* may either be one continuous heating element or separate, individually controllable heating elements. In the latter case, "dual zone" heating may be created by operating the upper heaters 240*a* and 240*b* at a temperature different than that of lower heaters 240*c* and 240*d*. As an example only, upper heaters 240*a* and 240*b* could be operated at 750 watts while lower heaters 240*c* and 240*d* could be operated at 625 watts. The same may be said for the resistance heaters 40*a*–40*d* of the embodiment of FIG. 3. The dual zone heating allows a higher platen temperature to be localized in the area of maximum compression, and therefore minimum thickness, of the food item while providing a lower temperature for the remaining portion of the platen so as to avoid burning. As a result, the upper heaters may be run at a higher temperature so as to decrease toasting time without burning the food items. Of course, the heaters 240*a*–240*d* (or 40*a*–40*d*) could each be operated at its own individual wattage/temperature if desired. Furthermore, the upper heaters could alternatively be operated at a wattage/temperature lower than that of the lower heaters. It should be noted that a variety of different types of heaters may be used for the upper and lower platen heaters.

While the preferred embodiments of the invention have been shown and described, it will be apparent to those skilled in the art that changes and modifications may be made therein without departing from the spirit of the invention, the scope of which is defined by the appended claims.

What is claimed is:

1. A device for toasting food items comprising:

a) a housing having an inlet for receiving the food items, an outlet for discharging the food items after they are toasted and a toasting chamber located between the inlet and the outlet, said toasting chamber having first and second conveyor belts disposed therein and means for activating said conveyor belts to move the food items through said toasting chamber;

b) a heat-conductive specifically shaped platen removably positioned between said conveyor belts to toast the food items as they are moved by said conveyor belts through said toasting chamber, said specifically shaped platen shaped so as to compress said food items as they are moved by said conveyor belts through said toasting chamber;

c) first and second heaters positioned within said toasting chamber, said first heater positioned in proximity to the first conveyor belt and said second heater positioned in proximity to the second conveyor belt; and d) first and second tensioners, said first tensioner engaging the first conveyor belt and said second tensioner engaging the second conveyor belt, said tensioners shaped so that said toasting chamber features at least one pathway that continuously tapers inward to a point of minimum thickness so that food items are compressed as they travel through the at least one pathway so that they are heated internally by said heaters, said pathway then continuously expands outward again.

2. The device of claim 1 wherein said platen contains heating elements.

3. The device of claim 2 wherein the heating elements are resistance heating elements.

4. The device of claim 3 further comprising a plug positioned within said housing that is operatively engaged when said platen is positioned within said toasting chamber so that electrical power is provided to said resistance heating elements.

5. The device of claim 1 wherein said platen features a diamond shaped cross-section.

6. The device of claim 1 wherein said conveyor belts are constructed of a heat-conductive material.

7. The device of claim 1 further comprising:

a) an axial rod rotatably mounted in said housing; and b) an abutment member operatively connected to said axial rod and engaging one of said first and second tensioners;

whereby the one of said first and second tensioners may be moved with respect to said platen so that the at least one pathway may be adjusted to accommodate food items of various thicknesses.

8. The device of claim 1 wherein the means for activating said first and second conveyor belts includes an electric motor positioned beneath an air duct, said air duct containing a fan positioned to exhaust air across the inlet of said housing;

whereby air heated by said electric motor rises up into said air duct and is directed across the inlet of said housing so that additional heat is retained within the housing.

9. The device claim 1 further comprising an inlet damper positioned at the inlet of said housing and an outlet damper positioned at the outlet of said housing.

10. The device of claim 1 further comprising a chute disposed adjacent to said outlet and said first and second conveyor belts with said second conveyor belt positioned in closer proximity to said chute than said first conveyor belt, said second conveyor belt moving faster than said first conveyor belt so that food items that have been moved by said first conveyor belt are stacked upon food items that have been moved by said second conveyor belt.

11. A device for toasting food items comprising:

a) a housing having an inlet for receiving the food items, an outlet for discharging the food items after they are toasted and a toasting chamber located between the inlet and the outlet, said toasting chamber having first and second conveyor belts disposed therein and means for activating said conveyor belts to move the food items through said chamber;

b) a heat-conductive platen positioned between said conveyor belts so that first and second pathways are defined;

c) first and second heaters positioned within said toasting chamber, said first heater positioned in proximity to the first conveyor belt and said second heater positioned in proximity to the second conveyor belt; and d) said platen featuring a generally diamond-shaped cross section so that each of said pathways tapers inwardly to a minimum thickness and then expands outwardly again so that food items are compressed and released as they travel through said pathways so that they are heated internally by said heaters.

12. The device of claim 11 wherein said platen contains heating elements.

13. The device of claim 12 wherein the heating elements are resistance heating elements.

14. The device of claim 11 wherein said conveyor belts are constructed of a heat-conductive material.

15. The device of claim 11 wherein the means for activating said first and second conveyor belts includes an electric motor positioned beneath an air duct, said air duct containing a fan positioned to exhaust air across the inlet of said housing;

whereby air heated by said electric motor rises up into said air duct and is directed across the inlet of said housing so that additional heat is contained within the housing.

16. The device of claim 11 further comprising an inlet damper positioned at the inlet of said housing and an outlet damper positioned at the outlet of said housing.

17. The device of claim 11 further comprising a chute disposed adjacent to said outlet and said first and second conveyor belts with said second conveyor belt positioned in closer proximity to said chute than said first conveyor belt, said second conveyor belt moving faster than said first conveyor belt so that food items that have moved through said first pathway are stacked upon food items that have moved through the second pathway on the chute.

18. A device for toasting food items comprising:

a) a housing having an inlet for receiving the food items, an outlet for discharging the food items after they are toasted and a toasting chamber located between the inlet and the outlet, said toasting chamber having first and second conveyor belts disposed therein and means for activating said conveyor belts to move the food items through said toasting chamber;

b) first and second heaters positioned within said toasting chamber, said first heater positioned in proximity to the first conveyor belt and said second heater positioned in proximity to the second conveyor belt; and c) first and second tensioners, said first tensioner engaging the first conveyor belt and said second tensioner engaging the second conveyor belt, said tensioners shaped so that said toasting chamber features a pathway that continuously tapers inward to a point of minimum thickness so that food items are compressed as they travel through the pathway so that they are heated internally by said heaters, said pathway then continuously expands outward again.

19. The device of claim 18 further comprising:
a) an axial rod rotatably mounted in said housing; and
b) an abutment member operatively connected to said axial rod and engaging one of said tensioners;
whereby the one of said tensioners may be moved with respect to said platen so that the pathway may be adjusted to accommodate food items of various thicknesses.

20. The device of claim 18 wherein said conveyor belts are constructed of a heat-conductive material.

21. A device for toasting food items comprising:
a) a housing having an inlet for receiving the food items, an outlet for discharging the food items after they are toasted and a toasting chamber located between the inlet and the outlet, said toasting chamber having first and second conveyor belts disposed therein and means for activating said conveyor belts to move the food items through said toasting chamber;
b) a heat-conductive specifically shaped platen positioned between said conveyor belts to toast the food items as they are moved by said conveyor belts through said chamber, said specifically shaped platen shaped so as to compress said food items as they are moved by said conveyor belts through said chamber and said specifically shaped platen containing upper and lower heating elements that may be operated at different temperatures to create at least two heating zones within said toasting chamber;
c) first and second heaters positioned within said toasting chamber, said first heater positioned in proximity to the first conveyor belt and said second heater positioned in proximity to the second conveyor belt; and
d) first and second tensioners, said first tensioner engaging the first conveyor belt and said second tensioner engaging the second conveyor belt, said tensioners shaped so that said toasting chamber features at least one pathway that continuously tapers inward to a point of minimum thickness so that food items are compressed as they travel through the at least one pathway so that they are heated internally by said first and second heaters and said platen, said pathway then continuously expands outward.

22. A device for toasting food items comprising:
a) a housing having an inlet for receiving the food items, an outlet for discharging the food items after they are toasted and a toasting chamber located between the inlet and the outlet, said toasting chamber having first and second conveyor belts dispose therein and means for activating said conveyor belts to move the food items through said chamber;
b) a heat-conductive platen positioned between said conveyor belts so that first and second pathways are defined, said platen containing upper and lower heating elements that may be operated at different temperatures to create at least two heating zones within said toasting chamber;
c) first and second heaters positioned within said toasting chamber, said first heater positioned in proximity to the first conveyor belt and said second heater positioned in proximity to the second conveyor belt; and
d) said platen featuring a generally diamond-shaped cross section so that each of said pathways tapers inwardly to a minimum thickness and then expands outwardly again so that food items are compressed and released as they travel through said pathways so that they are heated internally by said first and second heaters and said platen.

\* \* \* \* \*